United States Patent [19]

Tietjen

[11] Patent Number: 4,780,843
[45] Date of Patent: Oct. 25, 1988

[54] WAIT MODE POWER REDUCTION SYSTEM AND METHOD FOR DATA PROCESSOR

[75] Inventor: Donald L. Tietjen, Austin, Tex.

[73] Assignee: Motorola, Inc., Schaumburg, Ill.

[21] Appl. No.: 107,899

[22] Filed: Oct. 13, 1987

Related U.S. Application Data

[63] Continuation of Ser. No. 928,622, Nov. 4, 1986, abandoned, which is a continuation of Ser. No. 549,955, Nov. 7, 1983, abandoned.

[51] Int. Cl.$^4$ .............................................. G06F 1/04
[52] U.S. Cl. .................... 364/900; 364/707
[58] Field of Search ... 364/200 MS File, 900 MS File, 364/707

[56] References Cited

U.S. PATENT DOCUMENTS

| | | | |
|---|---|---|---|
| 3,736,569 | 5/1973 | Bouricius et al. | 365/227 |
| 3,941,989 | 3/1976 | McLaughlin et al. | 364/900 |
| 4,137,563 | 1/1979 | Tsunoda | 364/200 |
| 4,151,611 | 4/1979 | Sugawara et al. | 365/227 |
| 4,171,539 | 10/1979 | Tawfik et al. | 364/900 |
| 4,285,043 | 8/1981 | Hashimoto et al. | 364/707 |
| 4,293,927 | 10/1981 | Hoshii | 364/900 |
| 4,316,247 | 2/1982 | Iwamoto | 364/200 |
| 4,317,180 | 2/1982 | Lies | 364/900 |
| 4,381,552 | 4/1983 | Nocilini et al. | 364/900 |
| 4,435,761 | 3/1984 | Kimoto | 364/200 |
| 4,463,440 | 7/1984 | Nishiura et al. | 364/900 |
| 4,570,219 | 2/1986 | Shibukawa et al. | 364/200 |
| 4,694,393 | 9/1987 | Hirano et al. | 364/200 |

*Primary Examiner*—Gareth D. Shaw
*Assistant Examiner*—Kevin A. Kriess
*Attorney, Agent, or Firm*—John A. Fisher; Jeffrey Van Myers; Jonathan P. Meyer

[57] ABSTRACT

A method and apparatus for reducing power consumption in a data processing system by interrupting the supply of clocking pulses to selected portions of the system in response to a power-down signal provided by a data processing portion of the system only if the state of a respective control signal indicates that that particular portion of the system is then disabled or otherwise inhibited from interrupting the operation of the data processing portion.

3 Claims, 2 Drawing Sheets

WAIT MODE POWER REDUCTION SYSTEM AND METHOD FOR DATA PROCESSOR

This is a continuation of application Ser. No. 928,622, filed Nov. 4, 1986, now abandoned, which is a continuation of application Ser. No. 549,955, filed Nov. 7, 1983, now abanonded.

CROSS REFERENCE TO RELATED APPLICATIONS

Related subject matter may be found in the following copending patent applications, both of which are assigned to the Assignee hereof;

1. Application Ser. No. 65,292, entitled "Method for Reducing Power Consumed by a Static Microprocessor", invented by James Remedi, filed Aug. 9, 1979; and 2. Application Ser. No. 65,293, now U.S. Pat. No. 4,748,559, entitled "Apparatus for Reducing Power Consumed by a Static Microprocessor", invented by Philip S. Smith and Kuppuswami Raghunathan, filed Aug. 9, 1979.

BACKGROUND OF THE INVENTION

The present invention relates, in general, to the field of microprocessors (MPUs) and microcomputers (MCUs). More particularly, the present invention relates to a wait mode power reduction system and method for a data processor which allows for the shutting down of a data processor subsystem, for example, a timer system, if an interrupt is impossible from that subsystem.

During a data processor wait mode, processing by the CPU is suspended. Thus, no changes can occur to the data processor condition code register (CCR) or the computer operating properly (COP) watchdog timer system, if utilized. In a stop mode, minimum power consumption is effectuated in a data processor because all clocks including the crystal oscillator are stopped while in this mode. Similarly, in the wait mode, while processing is also suspended, portions of a data processor's subsystems may be shut down during this mode to effectuate a power consumption savings. However, if significant circuitry were required to determine the subsystem's ability or inability to be shut down, the savings in the wait mode power would be obviated by the cost in on-chip area and circuit complexity. In CMOS circuitry, power consumption is virtually all due to signal transitions of the various device nodes. Therefore, if the clocks to the data processor subsystem are stopped, power consumption is reduced to an absolute minimum.

By determining a subsystem's ability or inability to produce an interrupt, it is possible for a data processor's subsystems to be shut down, thus effectuating a power savings.

SUMMARY OF THE INVENTION

It is therefore an object of the present invention to provide an improved wait mode power reduction system and method for a data processor.

It is further an object of the present invention to provide an improved wait mode power reduction system and method for a data processor which shuts down a data processor subsystem if interrupts are precluded from the subsystem.

It is still further an object of the present invention to provide an improved wait mode power reduction system and method for a data processor which reduces power consumption by a data processor timer system if no timer interrupts are allowed.

It is still further an object of the present invention to provide an improved wait mode power reduction system and method for a data processor which may be readily integrated with a data processor requiring little on-chip area yet providing significant reduction in power consumption.

The foregoing and other objects are achieved in the present invention wherein there is provided a wait mode power reduction system and method for a data processor which comprises means for monitoring a subsystem of the data processor to determine if the subsystem is precluded from generating an interrupt to the data processor. Logic means are coupled to a control output of the monitoring means for deactivating the subsystem in response to a wait mode output signal from the data processor if the subsystem is precluded from generating an interrupt to the data processor.

In a specific embodiment of the present invention, there is provided a data processor including a wait mode power reduction system which comprises register means for holding a control bit therein. The control bit has a first value thereof wherein a subsystem of the data processor is precluded from generating an interrupt to the data processor and a second value thereof wherein the subsystem may generate an interrupt to the data processor. Logic means are coupled to the register means for deactivating the subsystem when the control bit has the first value thereof in response to a wait mode output signal from the data processor.

BRIEF DESCRIPTION OF THE DRAWINGS

The above-mentioned and other features and objects of the invention and the manner of attaining them will become more apparent and the invention itself will be best understood by reference to the following description of the embodiment of the invention taken in conjunction with the accompanying drawings, wherein.

DESCRIPTION OF A PREFERRED EMBODIMENT

Figure 1:
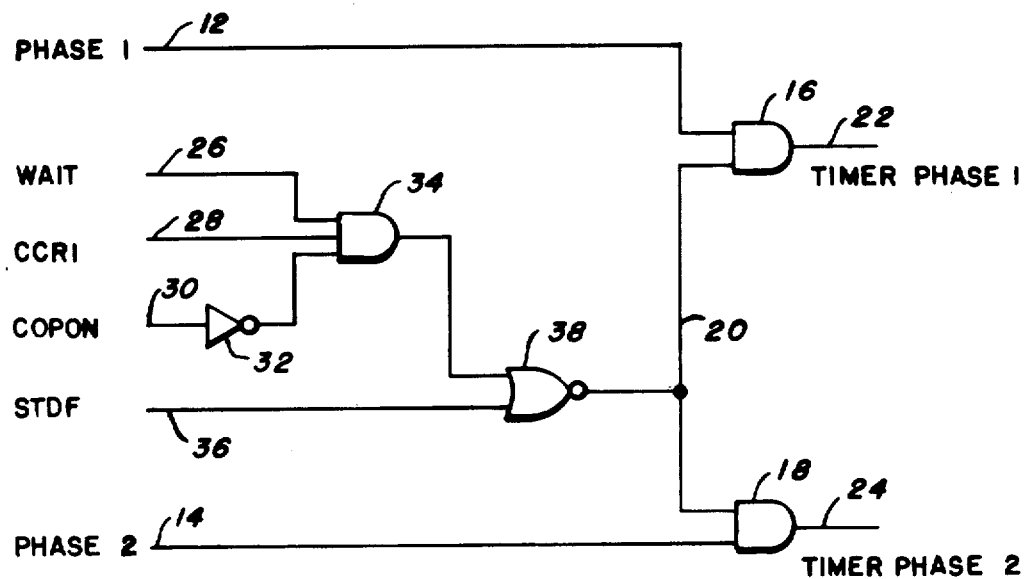
FIG. 1 is a simplified logic flow diagram of a wait mode power reduction system in accordance with the present invention for use with a shared clocking chain having a COP watchdog system.

With reference to FIG. 1, a wait mode power reduction system 10 is shown. Wait mode power reduction system 10 is utilized to effectively shut down a data processor timer, or a particular data processor subsystem, in response to certain specified conditions. In the embodiment shown, wait mode power reduction system 10 is utilized to selectively apply a timer output signal to timer phase one line 22 and timer phase two line 24.

Wait mode power reduction system 10 has as inputs phase one line 12 and phase two line 14 each connected as one input to AND gates 16, 18 respectively. The outputs of AND gates 16, 18 appear on timer phase one line 22 and timer phase two line 24 respectively. Wait line 26, connected to a control output of a data processor, is applied as one input to tri-input AND gate 34, having its output connected to one input of NOR gate 38. An additional input to tri-input AND gate 34 is furnished on CCRI line 28, connected to the I bit of a data processor condition code register. An additional input to tri-input AND gate 34 is supplied on COPON lfne 30 through inverter 32. A stop signal on stop line 36 is furnished as the remaining input to NOR gate 38, having its output connected to the remaining inputs of AND gates 16 and 18 connected to enable line 20.

In operation, a logic signal of a predetermined value will appear on COPON line 30 for use with a data processor having a computer operating properly (COP) watchdog as will be more fully described hereinbelow. Thus, the signal appearing on COPON line 30 determines whether or not a watchdog timeout will cause a system reset. This control bit, once programmed, remains set or cleared even when power is not applied to the data processor. Thus, the COP function is enabled or disabled independent of resident software. Thus, if a logic zero appears on COPON line 30 the COP system does not force a reset on timeout. If a logic one appears on COPON line 30, the COP system is enabled and would force a reset on timeout.

The signal appearing on CCRI line 28 is obtained from the I bit of a condition code register. This I bit is a class maskable interrupt which provides a signal on CCRI line 28 which indicates whether or not the data processor timer can generate an interrupt. Thus, if the I bit of the condition code register is set (equal to one) a logic one level will appear on CCRI line 28.

The wait mode in a data processor is invoked by executing the appropriate OP code. In the wait mode, the CPU registers are stacked and CPU processing is suspended until a qualified interrupt is detected. This interrupt can be an external interrupt (XIRQ) or any internally generated interrupts such as timer or serial interrupts. When the wait mode is invoked, a logic one level will appear on wait line 26.

Upon coincidence of a logic one level on wait line 26, a logic one level on CCRI line 28 and a logic zero on COPON line 30, a logic one level will appear at the output of tri-input AND gate 34. This logic one level applied to one input of NOR gate 38 will cause a logic zero level to appear at the output thereof on enable line 20. The logic zero level appearing on enable line 20 is applied to one input of AND gates 16,18 thereby preventing the input signals to wait mode power reduction system 10 appearing on phase one line 12 and phase two line 14 from being output on timer phase one line 22 and timer phase two line 24 respectively. As can be seen, a logic one level appearing on stop line 36 for input to NOR gate 38 will likewise cause a logic zero level to appear on enable line 20.

Figure 2:
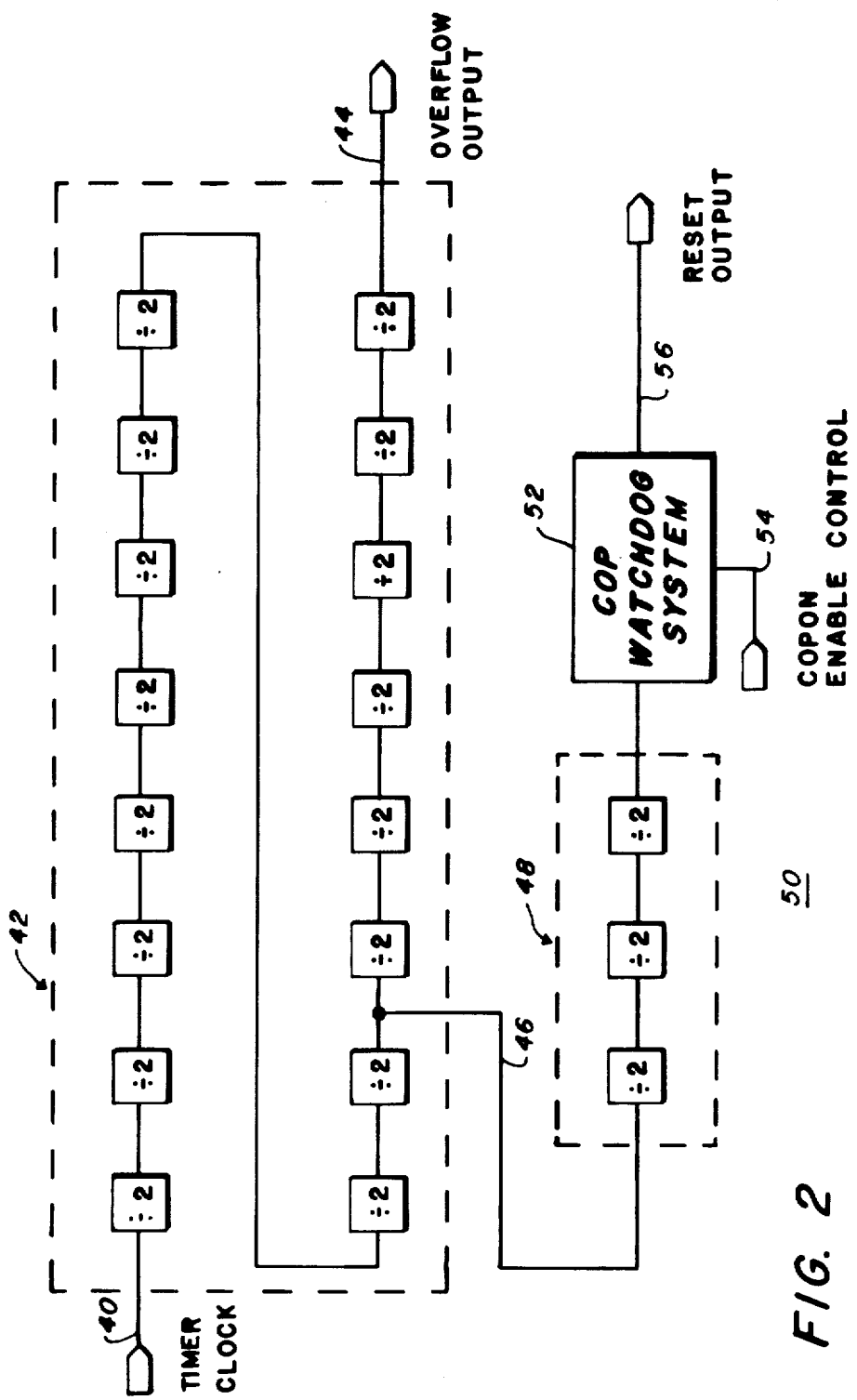
FIG. 2 is a simplified logic flow diagram of a clocking chain for use with the wait mode power reduction system of the present invention.

Referring additionally now to FIG. 2, a clocking chain 50 of a data processor for use in conjunction with wait mode power reduction system 10 of FIG. 1 is shown. Clocking chain 50 comprises in pertinent part a divider chain 42, optional divider stage 48 and watchdog system 52. Clocking input to divider chain 42 is provided on clock input line 40. An output of divider chain 42 is supplied on overflow output line 44. An additional output of divider chain 42 appears on timer tap line 46 for input to optional divider stage 48. Optional divider stage 48 provides an input to watchdog system 52 having a COPON enable control signal on COP system enable line 54. The output of watchdog system 52 appears on reset control output line 56 for providing a reset control signal to a data processor. As can be seen, the necessity of providing a signal on COPON line 30 to wait mode power reduction system 10 is due to the fact that clocking chain 50 shares a portion of divider chain 42 with watchdog system 52. Thus, if a shared timer system were not used in a data processor, it would be possible to eliminate COPON line 30 and inverter 32 as inputs to tri-input AND gate 34. Therefore, a wait mode power reduction system 10 may be effectuated having only the inputs appearing on wait line 26 and CCRI line 28 to a two-input AND gate in place of tri-input AND gate 34. Further, in a simplified wait mode power reduction system 10, if stop line 36 were eliminated as an input to NOR gate 38, the functions of the dual input AND gate and NOR gate 38 could be combined into a single NAND gate having as inputs signals on wait line 26 and CCRI line 28.

With reference to FIGS. 1 and 2, it will be seen that the signal appearing on COP system enable line 54 is the same as that appearing on COPON line 30. In a specific embodiment, the signal appearing on COP system enable line 54, and hence, COPON line 30 would be established by means of mask programming or a nonvolatile EEPROM bit. The signal would remain in one state at all times while power was applied to the device, and can never be changed during the entry to, or exit from, the wait mode. If the COP function is not used, the signal on COP system enable line 54 and COPON line 30 would be an active low. In this instance, the signal appearing on CCRI line 28 would be an indication of whether or not interrupts could come from the data processor timer. If the I bit in the condition code register were set, it would not be possible for an interrupt to come in through the timer. The I bit in the condition code register is a class mask, that is, it masks interrupts from all maskable sources. In general, external interrupt requests (XIRQ) and a number of reset conditions are not maskable interrupt sources. By setting the I bit in the condition code register to a logic one, whereby a logic one level would appear on CCRI line 28, a lower power consumption state would be entered upon receiving a wait signal on wait line 26 from the data processor. In practice, the instruction sequence would be to first set the I bit in the condition code register and then, on a subsequent instruction, enter the wait mode. In a system utilizing a clocking chain 50 as shown, it would be necessary that the signal on COPON line 30 be a logic zero.

In exiting the wait mode, a hardware mechanism would respond to an enabled interrupt to return all of the system clocks to operation allowing the data processor to resume functioning after a one or two cycle delay. It should be noted that nothing can be done with the I bit in the condition code register while the data processor is disabled. In the stop mode, a logic one level would appear on stop line 36 thereby shutting off the signals appearing on timer phase one line 22 and timer phase two line 24. Although shown as a means of controlling a timer output, it should also be noted that it is possible that the clocks to a data processor may be stopped at the oscillator itself thereby providing a greater savings in power consumption.

Wait mode power reduction system 10 of the present invention is of especial utility in a CMOS device, since almost all of the power of the device is due to the switching of the various nodes thereof. If the clocks to the data processor subsystems are stopped, power consumption of the subsystem is reduced to a minimum.

What has been provided therefore is an improved wait mode power reduction system and method for a data processor which shuts down a data processor subsystem if interrupts are precluded from the subsystem.

The system and method of the present invention reduces power consumption by a data processor timer system if no timer interrupts are allowed. The wait mode power reduction system and method for a data processor of the present invention may be readily integrated with a data processor requiring little on-chip area yet providing a significant reduction in power consumption.

While there have been described above the principles of the invention in conjunction with specific apparatus, it is to be clearly understood that this description is made only by way of example and not as a limitation to the scope of the invention.

I claim:

1. In a data processing system comprising:
   data processor means for executing instructions and for responding to interrupt requests;
   subsystem means for providing interrupt requests to said data processor;
   interrupt mask means responsive to the execution of instructions by said data processor means for preventing sid data processor means for responding to interrupt requests from said subsystem means; and
   clock means for supplying clocking pulses to said data processor means and said subsystem means; a power reduction system comprising:
   wait mode means responsive to a power-down signal received from said data processor means for reducing power consumption by the data processing system; and
   clock stopping means responsive to said power-down signal for interrupting the supply of clocking pulses to said subsystem means only if said interrupt mask means is preventing said data processor means from responding to interrupt requests from said subsystem means.

2. A data processing system according to claim 1 further comprising:
   monitor means for receiving clocking pulses from said clock means and for periodically resetting said data processing means; and
   monitor control means responsive to the execution of instructions by said data processing means for preventing said monitor means from resetting said data processing means; and wherein:
   said clock stopping means is further responsive to said power-down signal for interrupting the supply of clocking pulses to said monitor means only if said monitor control means is preventing said monitor means from resetting said data processing means.

3. A data processing system according to claim 1 wherein said subsystem means further comprises:
   monitor means for periodically resetting said data processor means; and
   monitor control means responsive to the execution of instructions by said data processing means for preventing said monitor means from resetting said data processing means; and wherein:
   said clock stopping means is further responsive to said monitor control means to interrupt the supply of clocking pulses to said subsystem means only if said monitor control means is preventing said monitor means from resetting said data processing means.

* * * * *

UNITED STATES PATENT AND TRADEMARK OFFICE
CERTIFICATE OF CORRECTION

PATENT NO. : 4,780,843

DATED : October 25, 1988

INVENTOR(S) : Donald L. Tietjen

It is certified that error appears in the above-identified patent and that said Letters Patent is hereby corrected as shown below:

column 5, line 22, change "sid" to --said--, column 5, line 22, change "for" to --from--.

Signed and Sealed this

Seventh Day of March, 1989

*Attest:*

DONALD J. QUIGG

*Attesting Officer*    *Commissioner of Patents and Trademarks*